United States Patent
Yoshida et al.

(10) Patent No.: US 6,262,166 B1
(45) Date of Patent: Jul. 17, 2001

(54) POLYPHENYLENE ETHER RESIN COMPOSITION

(75) Inventors: Kazuo Yoshida; Eiji Ueda; Jurou Ohzeki, all of Sodegaura (JP)

(73) Assignee: Asahi Kasei Kabushiki Kaisha (JP)

( * ) Notice: Subject to any disclaimer, the term of this patent is extended or adjusted under 35 U.S.C. 154(b) by 0 days.

(21) Appl. No.: 09/516,099

(22) Filed: Mar. 1, 2000

Related U.S. Application Data

(62) Division of application No. 09/130,118, filed on Aug. 6, 1998, now Pat. No. 6,054,516.

(30) Foreign Application Priority Data

Aug. 8, 1997 (JP) .................................................. 9-214823
Aug. 8, 1997 (JP) .................................................. 9-214823

(51) Int. Cl.[7] ...................................................... C08L 73/00
(52) U.S. Cl. ............................................ 524/508; 525/133
(58) Field of Search ............................. 525/133; 524/508

(56) References Cited

U.S. PATENT DOCUMENTS 4,456,736 * 6/1984 Miyashita et al. .
4,797,453 * 1/1989 Taubitz et al. .

FOREIGN PATENT DOCUMENTS

01079242 * 3/1989 (JP) .
09031321 * 2/1992 (JP) .

* cited by examiner

*Primary Examiner*—Ana Woodward
(74) *Attorney, Agent, or Firm*—Pennie & Edmonds LLP

(57) ABSTRACT

A polyphenylene ether resin composition which comprises: (A) from 30 to 95% by weight of a modified polyphenylene ether resin entirely or partially modified with an unsaturated carboxylic acid or a functional derivative thereof; (B) from 2 to 60% by weight of at least one of a polystyrene and a rubber-modified polystyrene; and (C) from 3 to 40% by weight of a styrene/acrylonitrile copolymer having an acrylonitrile ingredient content of from not less than 7% by weight to less than 11% by weight. The resin composition optionally contains (D) from 1 to 30 parts by weight of a phosphoric acid ester compound; and (E) from 1 to 100 parts by weight of an inorganic filler, each per 100 parts by weight of the total amount of said components (A), (B) and (C). Also disclosed is a molded article prepared from the resin composition.

5 Claims, No Drawings

POLYPHENYLENE ETHER RESIN COMPOSITION

This is a division of application Ser. No. 09/130,118, filed Aug. 6, 1998, now U.S. Pat. No. 6,054,516.

BACKGROUND OF THE INVENTION

1. Technical Field

This invention relates to novel polymer blend compositions which are excellent in fluidity, heat resistance and mechanical characteristics.

2. Background Art

Thermoplastic resins having well-balanced fluidity, heat resistance and mechanical characteristics are generally needed for industrial purposes.

For example, polyphenylene ether resins are excellent in mechanical characteristics, electrical properties, acid-resistance, alkali-resistance, heat resistance, etc. and have low water absorbing capacity and high dimensional stability. Because of having these properties, polyphenylene ether resins have been widely employed as, for example, housing chassis materials in electrical apparatuses and office automation (OA) instruments such as computers and word processors. Moreover, it is frequently required that these materials be flame retarding from the viewpoint of fire prevention. With the recent remarkable progress in the technology, OA instruments have become more and more small-scaled and lightweight with improved functions. Thus, these materials are frequently molded into thin-walled articles. Therefore, it has been desired to further improve the fluidity (molding proccessability) of these resin materials.

Because of its poor fluidity, polyphenylene ether is generally employed in the form of polymer blends with polystyrene, as suggested by JP-B-43-17812 (the term "JP-B" as used herein means an "examined Japanese patent publication") and U.S. Pat. No. 3,383,435. Polyphenylene and polystyrene are compatible with each other completely at an arbitrary ratio. As the polystyrene content increases, the fluidity is improved but the heat resistance is lowered. Although JP-B-48-40046 discloses mixtures of a polyphenylene ether with a styrene/acrylonitrile copolymer containing from 3 to 18% by weight of the acrylonitrile component, these compositions are not necessarily satisfactory in the balance of heat resistance, fluidity and mechanical characteristics.

Further, JP-A-6-306254 (the term "JP-A" as used herein means an "unexamined published Japanese patent application") discloses a technique for improving the balance of heat resistance and fluidity by using an acrylonitrile/styrene resin containing a specific amount of acrylonitrile. However, this technique suffers from a problem that peeling phenomenon of the resin is not sufficiently controlled and has a poor practical strength.

Furthermore, JP-A-9-31321 discloses a technique for improving the fluidity of a resin composition by blending a polyphenylene ether, a polystyrene and/or rubber-modified polystyrene with a styrene/acrylonitrile copolymer having an acrylonitrile content of from 7 to 11% by weight and a melt flow rate of from 5 to 100 g/10 min. Although the fluidity can be improved thereby, the impact strength and heat distortion temperature are lowered with a decrease in the molding temperature.

SUMMARY OF THE INVENTION

An object of the present invention is to provide novel polymer blend compositions which are excellent in their balance of fluidity, heat resistance, mechanical characteristics, etc. and whose qualities suffer little from changes in the mold processing temperature.

Other objects and effects of the present invention will become apparent from the following description.

To solve the above-mentioned problems, the present inventors have conducted extensive studies to establish a technique for improving the balance between fluidity and heat resistance. As a result, they have discovered that this object can be achieved by using a specific polymer blend composition, thus completing the present invention. That is, the above described objectives of the present invention have been achieved by providing the following composition:

(1) A polyphenylene ether resin composition which comprises:

(A) from 30 to 95% by weight of a modified polyphenylene ether resin entirely or partially modified with an unsaturated carboxylic acid or a functional derivative thereof;

(B) from 2 to 60% by weight of at least one of a polystyrene and a rubber-modified polystyrene; and (C) from 3 to 40% by weight of a styrene/acrylonitrile copolymer having an acrylonitrile ingredient content of from not less than 7% by weight to less than 11% by weight.

(2) The composition according to the above (1), wherein said component (C) has a melt flow rate of from 5 to 100 g/10 min as determined at 220° C. with a load of 10 kg.

(3) The composition according to the above (1), further comprising (D) from 1 to 30 parts by weight of a phosphoric acid ester compound per 100 parts by weight of the total amount of said components (A), (B) and (C).

(4) The composition according to the above (3), wherein said phosphoric acid ester compound (D) is a condensed phosphoric acid ester.

(5) The composition according to the above (1), further comprising (E) from 1 to 100 parts by weight of an inorganic filler per 100 parts by weight of the total amount of said components (A), (B) and (C).

(6) The composition according to the above (1), further comprising:

(D) from 1 to 30 parts by weight of a phosphoric acid ester compound; and (E) from 1 to 100 parts by weight of an inorganic filler, each per 100 parts by weight of the total amount of said components (A), (B) and (C).

(7) A molded article comprising a composition according to the above (5).

(8) A molded article comprising a composition according to the above (6).

(9) A large-sized chassis comprising a composition according to the above (5).

(10) A large-sized chassis comprising a composition according to the above (6).

DETAILED DESCRIPTION OF THE INVENTION

Polyphenylene ether resin for use in the modified polyphenylene ether resin (A) according to the present invention is a homopolymer or a copolymer preferably having repeating unit(s) represented by general formula (I) and/or general formula (II).

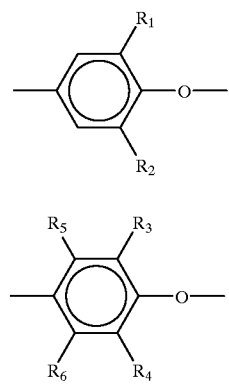

wherein $R_1$, $R_2$, $R_3$, $R_4$, $R_5$ and $R_6$ independently represent a $C_{1-4}$ alkyl group, an aryl group, a halogen atom or a hydrogen atom, provided that $R_5$ and $R_6$ do not represent hydrogen at the same time.

Typical examples of the polyphenylene ether homopolymer resin include
poly(2,6-dimethyl-1,4-phenylene) ether,
poly(2-methyl-6-ethyl-1,4-phenylene) ether,
poly(2,6-diethyl-1,4-phenylene) ether,
poly(2-ethyl-6-n-propyl-1,4-phenylene) ether,
poly(2,6-di-n-propyl-1,4-phenylene) ether,
poly(2-methyl-6-n-butyl-1,4-phenylene) ether,
poly(2-ethyl-6-isopropyl-1,4-phenylene) ether,
poly(2-methyl-6-chloroethyl-1,4-phenylene) ether,
poly(2-methyl-6-hydroxyethyl-1,4-phenylene) ether and
poly(2-methyl-6-chloroethyl-1,4-phenylene) ether.

Among these homopolymers, poly(2,6-dimethyl-1,4-phenylene) ether is particularly preferred.

The term "polyphenylene ether copolymer" as used herein means a copolymer having a phenylene ether structure as the major monomer unit. Examples thereof include
2,6-dimethylphenol/2,3,6-trimethylphenol copolymers,
2,6-dimethylphenol/o-cresol copolymers and
2,6-dimethylphenol/2,3,6-trimethylphenol/o-cresol copolymers.

In the present invention, the polyphenylene ether resin is entirely or partially modified with an unsaturated carboxylic acid or a functional derivative thereof to be used as the modified polyphenylene ether resin (A). The modified polyphenylene ether resin can be produced by, for example, kneading a polyphenylene ether resin together with an unsaturated carboxylic acid or a functional derivative thereof in a molten state in the presence of a radical initiator such as organic peroxides, diazo compounds, etc. to react these. Examples of the unsaturated carboxylic acid and its functional derivative include maleic acid, fumaric acid, itaconic acid, halogenated maleic acid, cis-4-cyclohexne-1,2-dicarboxylic acid, endo-cis-bicyclo(2,2,1)-5-heptene-2,3-dicarboxylic acid; anhydrides, esters, amides and imides of these dicarboxylic acids; acrylic acid, methacrylic acid; and esters and amides of these monocarboxylic acids. These compounds may be used either alone or in combination of two or more thereof. Among them, unsaturated dicarboxylic acids and functional derivatives thereof, in particular, maleic anhydride can be preferably used. The content (in 100% by weight of component (A)) of such a carboxylic acid or its functional derivative is generally at least 0.01% by weight, preferably at least 0.03% by weight. When the content thereof is less than 0.01% by weight, changes in the qualities due to the mold processing temperature can be scarcely regulated and adhesion of the resin phase to inorganic fillers can be little improved. However, these effects cannot be improved any more when the content of the unsaturated carboxylic acid or its functional derivative exceeds 10% by weight. From an economic viewpoint, therefore, the content thereof ranges usually from 0.01 to 10% by weight and preferably from 0.03 to 5% by weight.

The polystyrene for use as component (B) is a homopolymer of styrene, while the rubber-modified polystyrene for use as component (B) is a graft copolymer of styrene with a rubbery polymer. Examples of the rubber for use in the rubber-modified polystyrene include polybutadiene, styrene/butadiene copolymer, polyisoprene, butadiene/isoprene copolymer, natural rubber and ethylene/propylene copolymer. Among all, particularly preferred are polybutadiene and styrene/butadiene copolymer. The content of rubber-form polymer in the rubber-modified polystyrene is generally from 2 to 15% by weight. As the rubber-modified polystyrene, commercial products can be used.

The styrene/acrylonitrile copolymer of component (C) for use in the present invention should contain the acrylonitrile component in an amount of from not less than 7 to less than 11% by weight on average, preferably from 8 to 10% by weight on average, and still preferably from 8.5 to 9.5% by weight on average. It is preferred that the styrene/acrylonitrile copolymer has a melt flow rate of from 5 to 100 g/10 min. Moreover, the composition distribution of the styrene/acrylonitrile copolymer is preferably narrower. Specifically, the proportion of styrene/acrylonitrile copolymers having an acrylonitrile content of from not less than 7% by weight to less than 11% by weight is preferably at least 60% by weight, still preferably at least 70% by weight in component (C). The composition distribution of the. copolymer can be measured by liquid chromatography.

According to the measurement of dynamic viscoelasticity, a molten mixture consisting of three components (i.e., the above-mentioned copolymer containing from not less than 7 to less than 11% by weight of the acrylonitrile component, the modified polyphenylene ether resin and the polystyrene) exhibits two glass transition temperatures. The phase separation structure thereof can be confirmed by observing its morphology under a transmission electron microscope.

As described above, the narrower the composition distribution of the above-mentioned copolymer is, the more desirable it is. This is because when the proportion of styrene/acrylonitrile copolymers containing less than 7% by weight of the acrylonitrile component is increased, viscoelastic behaviors and fluidity/heat resistance balance become similar to those of a mixture of the modified polyphenylene ether resin and the polystyrene, and thus the effects of improving the fluidity and heat resistance would be deteriorated. When the proportion of styrene/acrylonitrile copolymers containing more than 11% by weight of the acrylonitrile component is increased, on the other hand, a glass transition point close to that of the styrene/acrylonitrile copolymer alone and another glass transition point close to the mixture of the modified polyphenylene ether resin and the polystyrene are observed due to the poor compatibility. As a result, injection-molded articles produced therefrom frequently suffer from layer-peeling, which lowers the practical usefulness thereof. In such a case, moreover, the mechanical characteristics are also deteriorated.

It is preferable that the above-mentioned styrene/acrylonitrile copolymer has a melt flow rate of from 5 to 100 g/10 min, more preferably from 30 to 80 g/10 min and still preferably from 40 to 60 g/10 min. The fluidity of the composition is elevated with an increase in the melt flow rate of the styrene/acrylonitrile copolymer. However, it is not preferable that the melt flow rate exceeds 100 g/10 min, since the mechanical strength of the resultant composition is deteriorated in such a case.

It is preferable to use components (A), (B) and (C) at the following mixing ratio, namely, from 30 to 95% by weight of the modified polyphenylene ether resin (A), from 2 to 60% by weight of the polystyrene and/or rubber-modified polystyrene (B), and from 3 to 40% by weight of the styrene/acrylonitrile copolymer (C). It is still preferable to use from 40 to 80% by weight of component (A), from 3 to 50% by weight of component (B) and from 10 to 35% by weight of component (C).

When the content of the modified polyphenylene ether resin is less than 30% by weight, the obtained composition has a low heat resistance and thus fails to achieve the characteristics of the present invention. When the content of the polystyrene and/or rubber-modified polystyrene exceeds 60% by weight, the obtained composition also has a low heat resistance and thus fails to achieve the characteristics of the present invention. The styrene/acrylonitrile copolymer may be used in such an amount as to give the desired fluidity. However, it is undesirable that its content exceeds 40% by weight, since the heat resistance is deteriorated thereby. It is also undesirable if the content thereof is less than 3% by weight, since the fluidity and heat resistance can be improved little in such a case.

The phosphoric acid ester compound for use as component (D) in the present invention means to include phosphoric acid ester flame-retardants in general. Examples thereof include phosphoric acid esters such as trimethyl phosphate, triethyl phosphate, tripropyl phosphate, tributyl phosphate, tripentyl phosphate, trihexyl phosphate, tricyclohexyl phosphate, triphenyl phosphate, tricresyl phosphate, trixylenyl phosphate, cresyldiphenyl phosphate, dicresylphenyl phosphate, dimethylethyl phosphate, methyldibutyl phosphate, ethyldipropyl phosphate and hydroxyphenyldiphenyl phosphate; modified compounds obtained by modifying these phosphoric acid esters with various substituents; and various condensed-type phosphoric acid ester compounds. Of these, condensed phosphoric acid ester compounds are preferred.

Among the above-enumerated compounds, phosphoric acid ester compounds represented by the following general formula (III) are particularly preferred.

Preferred examples of the phosphoric acid ester compound for use as component (C) are those having a bond structure formed by a "specific bifunctional phenol" or a terminal structure formed by a "specific monofunctional phenol". Examples of the "specific bifunctional phenol" include bisphenols such as 2,2-bis(4-hydroxyphenyl) propane (commonly called bisphenol A), 2,2-bis(4-hydroxy-3-ethylphenyl)propane, bis(4-hydroxyphenyl)methane, bis (4-hydroxy-3,5-dimethylphenyl)methane and 1,1-bis(4-hydroxyphenyl)ethane, though the present invention is not restricted thereto. Among all, bisphenol A is particularly preferred.

As the "specific monofunctional phenol", use can be made of unsubstituted phenol, monoalkylphenols, dialkylphenols and trialkylphenols either alone or as a mixture of two or more thereof. Particularly preferred are phenol, cresol, dimethylphenol (mixed xylenol), 2,6-dimethylphenol and trimethylphenol. These phosphoric acid ester compounds may be used either alone or as a mixture of two or more thereof.

The amount of added component (D) ranges from 1 to 30 parts by weight, preferably from 2 to 20 parts by weight and still preferably from 5 to 15 parts by weight per 100 parts by weight of the total amount of components (A), (B) and (C). When the amount of component (D) is less than 1 parts by weight, only insufficient flame retardant effect can be achieved. When the amount thereof exceeds 30 parts by weight, on the other hand, the heat resistance and mechanical characteristics of the composition are deteriorated and, moreover, there arises an economical disadvantage.

It is also effective to use the phosphoric acid ester compound together with other flame-retardants and dropping inhibitors such as polytetrafluoroethylene, silicone resins, phenol resins, glass fibers and carbon fibers.

The composition of the present invention may further contain, as component (E), inorganic fillers such as glass fibers, glass flakes, kaolin clay and talc and other fibrous reinforcing agents, to thereby give a high-strength complex having excellent fluidity and heat resistance. These compo-

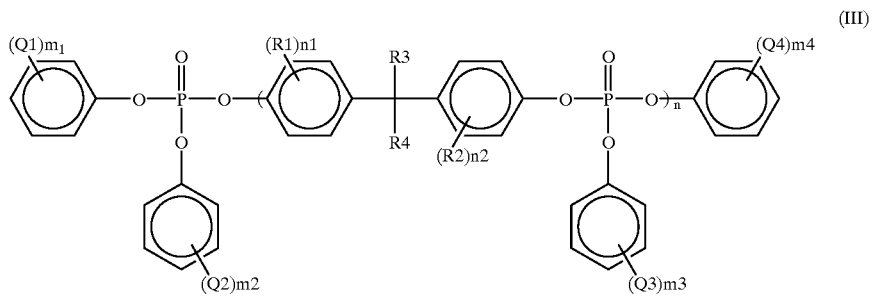

(III)

wherein Q1, Q2, Q3 and Q4 each represents $C_{1-6}$ alkyl or hydrogen; R1, R2, R3 and R4 each represents methyl or hydrogen; n represents an integer of 1 or more; n1 and n2 each represents an integer of from 0 to 2; and m1, m2, m3 and m4 each represents an integer of from 1 to 3.

In the general formula (III), Q1, Q2, Q3 and Q4 are particularly preferably methyl groups.

In the general formula (III), R1 and R2 are preferably hydrogen atoms while R3 and R4 are preferably methyl groups.

The heat resistance and proccessability of the composition of the present invention vary depending on n, which is an integer of 1 or more, in the general formula (III). It is preferable that n ranges from 1 to 5. A mixture of the phosphoric acid ester compounds having different n values is acceptable.

nents (E) may be employed in an amount of from 1 to 100 parts by weight, preferably from 5 to 80 parts by weight, per 100 parts by weight of the total amount of components (A), (B) and (C).

In case where an unmodified polyphenylene ether is used to replace all the modified polyphenylene ether resin as component (A), the physical properties of the obtained composition such as heat distortion temperature (HDT) and impact strength would be varied when the molding conditions are largely changed. It is advantageous to use the modified polyphenylene ether resin as in the present invention, since these variations in the physical properties can be suppressed thereby.

To stabilize the physical properties with the use of the modified polyphenylene ether resin, it is preferable to prepare the composition at a temperature of 280° C. or higher.

This is because the preparation at a high temperature makes it possible to stabilize the physical properties by using a small amount of the unsaturated carboxylic acid or its functional derivative unit.

The resin composition of the present invention may appropriately contain, as impact resistance-imparting agents, styrene-based thermoplastic elastomers, such as styrene/butadiene block copolymers, styrene/isoprene block copolymers and hydrogenated elastomers thereof. The amount of the added impact resistance-imparting agent may be appropriately selected depending on the intended purpose, but is generally from 0.5 to 20 parts by weight per 100 parts by weight of the total amount of components (A), (B) and (C).

The resin composition of the present invention may further contain other additives such as plasticizers, stabilizers (antioxidants, UV absorbers, etc.), antistatic agents, mold-releasing agents, dyes, pigments and other resins to impart other characteristics thereto, so long as the effects of the present invention are not deteriorated.

The preparation process of the composition of the present invention is not particularly limited. The composition of the present invention can be produced by kneading with, for example, extruders, heat rolls, kneaders, Banbury mixers, etc. Of these, kneading the blend with an extruder is preferred from the viewpoint of productivity. The kneading temperature generally ranges from 250 to 360° C., preferably from 280 to 340° C. All of the components may be kneaded together at once. Alternatively, components (A), (B) and (C) may be first pre-kneaded and then components (D), (E), etc. may be added into the extruder and kneaded.

Since the resin composition of the present invention has excellent fluidity, heat resistance and mechanical characteristics, it can be applied to various kinds of use. The resin composition of the present invention is particularly useful for large-sized molded articles, specifically large-sized chassis, more specifically chassis for office automation printers, facsimile machines, copiers, etc.

The present invention will be described in detail with reference to the following Examples, but the invention should not be construed as being limited thereto.

The physical properties of each resin composition thus obtained were evaluated by the following methods.

(1) Molding fluidity

SSP: A molded piece of 1.6 mm in thickness, 12.7 mm in width and 127 mm in length in the flow direction was formed by injection molding. In this step, the minimum molding pressure required for completely filling this molded piece (hereinafter referred to simply as SSP, expressed in gauge pressure kg/cm$^2$) was measured and employed as an indication of molding fluidity. A lower SSP means the better molding fluidity.

(2) Heat distortion temperature

HDT was determined with a load of 18.6 kg/cm$^2$ in accordance with ASTM D648 and employed as an indication of heat resistance.

(3) Flexural strength

Determined in accordance with ASTM D790.

(4) IZOD impact strength (notched)

Determined at 23° C. in accordance with ASTM D256.

(5) Flame retardancy

Determined by using an injection molded test piece having a thickness of ⅛ inch in accordance with a vertical firing test UL-94.

(6) Falling weight impact strength

By using a molded plate piece (50 mm×90 mm×2.5 mm in thickness), the total absorption energy (J) was measured with Graphic Impact Tester (trade name) manufactured by Toyo Seiki Co., Ltd.

The following components were employed in the Examples and Comparative Examples described below.

(1) Styrene/acrylonitrile copolymers (AS-1 to AS-3):

A liquid mixture consisting of 4.7 parts by weight of acrylonitrile, 73.3 parts by weight of styrene, 22 parts by weight of ethylbenzene and 0.02 parts by weight of t-butylperoxy-isopropyl carbonate employed as a polymerization initiator was supplied continuously into a complete mixing-type reactor (capacity: 5 liter) at a flow rate of 2.5 liter/hr and polymerization was performed at 142° C. until the degree of polymerization reached 60%. Then the polymer solution was fed continuously into a vent-type extruder where the unreacted monomers and the solvent were removed therefrom at 260° C. and 40 Torr. Next, the polymer was continuously solidified by cooling and cut into pieces to give a particulate styrene/acrylonitrile copolymer (referred to as AS-1). When analyzed by IR absorption spectrometry, this copolymer was composed of 9% by weight of the acrylonitrile unit and 91% by weight of the styrene unit and had a melt flow rate of 90 g/10 min (measured at 220° C. with a load of 10 kg in accordance with ASTM D-1238). This copolymer is referred to as AS-1 hereinafter.

The above procedure was repeated but the composition of the starting monomers and the polymerization temperature were changed to thereby give styrene/acrylonitrile copolymers (referred to as AS-2 and AS-3) which differ from AS-1 in copolymer composition and melt flow rate.

Table 1 summarizes the properties of the copolymers AS-1 to AS-3.

The distribution of the acrylonitrile component in each acrylonitrile/styrene resin was measured by high performance liquid chromatography under the conditions as specified below.

Instrument: Shimazu LC-64 series.

Column: Shimapack CLC-CN (4.6×250 mm).

Column temp.: 40° C.

Flow rate: 1 ml/min.

Detector: UV detector (254 nm).

Mobile phase: THF/n-heptane: starting with 20/80 20 min after; 100/0.

TABLE 1

|  | AS-1 | AS-2 | AS-3 | PS-1 | PS-2 |
|---|---|---|---|---|---|
| AN content (wt. %) | 9 | 5 | 9.5 | 0 | 0 |
| MFR[1] (g/10 min) | 90 | 42 | 34 | 30 | 93 |

[1]MFR: melt flow rate (measured at 220° C. with a load of 10 kg.)

(2) Polyphenylene ether

PPE-1: poly(2,6-dimethyl-1,4-phenylene) ether having a reduced viscosity η sp/c measured at 30° C. in chloroform of 0.53 dl/g.

PPE-2: poly(2,6-dimethyl-1,4-phenylene) ether having a reduced viscosity η sp/c measured at 30° C. in chloroform of 0.43 dl/g.

(3) Modified polyphenylene ether

PPE-3: a modified polyphenylene ether resin obtained by melt-kneading 100 parts by weight of PPE-2, 2 parts by weight of maleic anhydride and 0.3 parts by weight of dicumyl peroxide with an extruder under a nitrogen atmosphere at 320° C. 1parts by weight of maleic anhydride was added per 100 parts by weight of the modified polyphenylene ether resin referred to as PPE-3.

(3) Polystyrene

PS-1: Asahi Kasei Polystyrene 685 (homopolystyrene manufactured by Asahi Chemical Industry Co., Ltd.).

PS-2: Asahi Kasei Polystyrene 680 (homopolystyrene manufactured by Asahi Chemical Industry Co., Ltd.).

PS-3: Asahi Kasei Polystyrene 403 (rubber-reinforced polystyrene manufactured by Asahi Chemical Industry Co., Ltd.).

(4) Phosphoric acid ester

FR-1: a mixture of compounds of formula (IV) with n being 1 to 3.

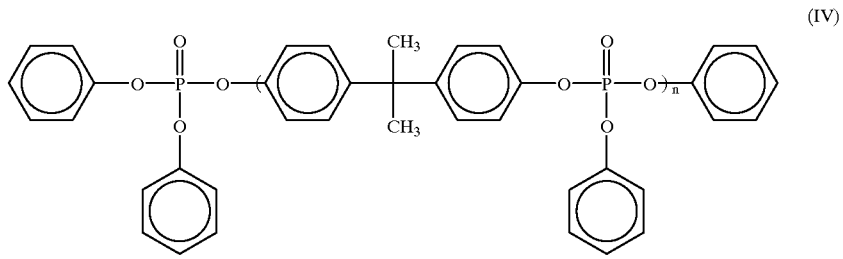

(IV)

using an injection machine having the heat cylinder temperature as listed in Tables 2 to 5, a mold temperature of 90° C. and a clamping pressure of 80 t. Thus the molding fluidity and the physical properties of the obtained molded piece were evaluated in each case. The results obtained are shown in Tables 2 to 5 below.

TABLE 2

| | Composition (wt. part) | | | | | Physical properties (molding temp. 280° C.) | | | | Physical properties (molding temp. 250° C.) | | | |
|---|---|---|---|---|---|---|---|---|---|---|---|---|---|
| | (A) PPE-1 | PPE-3 | (B) PS-1 | PS-3 | (C) AS-3 | (D) FR-1 | SSP (kg/cm$^2$) | HDT (° C.) | flexural strength (kg/cm$^2$) | falling weight impact strength (J) | SSP (kg/cm$^2$) | HDT (° C.) | flexural strength (kg/cm$^2$) | falling weight impact strength (J) |
| Ex. 1 | 53.8 | 5.4 | 10.2 | 15.1 | 15.5 | 10.9 | 41 | 111 | 1080 | 15 | 67 | 110 | 1100 | 15 |
| Comp. Ex. 1 | 59.2 | — | 10.2 | 15.1 | 15.5 | 10.9 | 42 | 110 | 1090 | 15 | 67 | 107 | 920 | 8 |

SSP: gauge pressure immediately before the full shot in injection molding at the heating cylinder temperature specified above.

FR-2: a compound represented by formula (V).

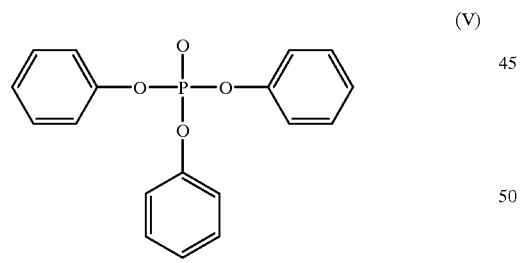

(V)

(5) Glass fiber

GF: chopped strands of 3 mm in fiber length surface-treated with aminosilane.

(6) Mica

Suzorite Mica 200K1 (manufactured by Kuraray Co., Ltd.) treated with aminosilane.

EXAMPLES AND COMPARATIVE EXAMPLES

Pelletized compositions were produced by feeding the components at the ratios as specified in Tables 2 to 5 into a twin-screw extruder in which the maximum temperature of the heat cylinder was regulated to 320° C. and melt-kneading therein. These pellets were injection-molded by

TABLE 3-1

| | Composition (wt. part) | | | | | | | |
|---|---|---|---|---|---|---|---|---|
| | (A) PPE-1 | PPE-2 | PPE-3 | (B) PS-1 | PS-3 | (C) AS-3 | (E) GF | mica |
| Example 2 | 21.1 | 34.5 | 3.8 | 8.8 | 16.5 | 15.4 | 38.5 | 15.4 |
| Comparative Example 2 | 21.1 | 38.3 | — | 8.8 | 16.5 | 15.4 | 38.5 | 15.4 |

TABLE 3-2

| | Physical properties (molding temp. 290° C.) | | | | Physical properties (molding temp. 260° C.) | | | |
|---|---|---|---|---|---|---|---|---|
| | SSP (kg/cm²) | HDT (° C.) | flexural strength (kg/cm²) | IZOD (kg.cm/cm) | SSP (kg/cm²) | HDT (° C.) | flexural strength (kg/cm²) | IZOD (kg.cm/cm) |
| Example 2 | 52 | 125 | 1410 | 4.5 | 75 | 125 | 1400 | 4.4 |
| Comparative Example 2 | 52 | 123 | 1380 | 4.3 | 76 | 120 | 1100 | 3.0 |

SSP: gauge pressure immediately before the full shot in injection molding at the heating cylinder temperature specified above.

TABLE 4

| | Composition (wt. part) | | | | | | | | Physical properties (molding temp. 290° C.) | | |
|---|---|---|---|---|---|---|---|---|---|---|---|
| | (A) PPE-1 | PPE-3 | (B) PS-2 | PS-3 | (C) AS-1 | (D) FR-1 | FR-2 | (E) GF | mica | SSP (kg/cm²) | HDT (° C.) | IZOD (kg.cm/cm) |
| Example 3 | 64.5 | 8 | 0 | 11.3 | 16.2 | 13 | 0 | 24 | 24 | 68 | 137 | 4.7 |
| Compara. Example 3 | 64.5 | 8 | 16.2 | 11.3 | 0 | 13 | 0 | 24 | 24 | 75 | 130 | 4.8 |
| Example 4 | 58 | 3.6 | 0 | 16.7 | 21.7 | 0 | 8.7 | 14.5 | 0 | 50 | 119 | 7.2 |
| Compara. Example 4 | 60.8 | 3.4 | 20.3 | 15.5 | 0 | 0 | 8.7 | 13.5 | 0 | 68 | 119 | 7.2 |

SSP: gauge pressure immediately before the full shot in injection molding at the heating cylinder temperature of 290° C.

TABLE 5

| | Composition (wt. part) | | | | | | | | | Physical properties (molding temp. 290° C.) | | |
|---|---|---|---|---|---|---|---|---|---|---|---|---|
| | (A) PPE-1 | PPE-3 | (B) PS-2 | PS-3 | (C) AS-1 | AS-2 | (D) FR-1 | (E) GF | mica | SSP (kg/cm²) | HDT (° C.) | IZOD (kg.cm/cm) |
| Example 5 | 55.9 | 4.6 | 14.8 | 6.3 | 18.5 | 0 | 17 | 28 | 37 | 44 | 120.9 | 1210 |
| Compara. Example 5 | 55.9 | 4.6 | 14.8 | 6.3 | 0 | 18.5 | 17 | 28 | 37 | 50 | 114.7 | 1210 |

SSP: gauge pressure immediately before the full shot in injection molding at the heating cylinder temperature of 290° C.

The resin compositions of the present invention are superior to the conventional compositions of polyphenylene ether with styrene resins in the balance of fluidity, heat resistance and mechanical characteristics, etc. Furthermore, the compositions of the present invention are excellent in flame retardancy. Thus, materials excellent in molding processability and heat resistance and mechanical characteristics at practical use can be provided.

What is claimed is:

1. A polyphenylene ether resin composition which comprises:
   component (A), a polyphenylene ether resin composition comprising a modified polyphenylene ether resin modified with an unsaturated carboxylic acid or a functional derivative thereof;
   component (B), at least one of a polystyrene and a rubber-modified polystyrene; and
   component (C), a styrenelacrylonitrile copolymer having an acrylonitrile ingredient content of from not less than 7% by weight to less than 11% by weight,
   wherein amounts of components (A), (B) and (C) are, respectively, from 30 to 95%, from 2 to 60%, and from 3 to 40% by weight based on a total amount of components (A), (B) and (C).

2. The composition according to claim 1, wherein said component (C) has a melt flow rate of from 5 to 100 g/10 min as determined at 220° C. with a load of 10 kg.

3. The composition according to claim 1, further comprising (E) from 1 to 100 parts by weight of an inorganic filler per 100 parts by weight of the total amount of said components (A), (B) and (C).

4. A molded article comprising a composition according to claim 3.

5. A large-sized chassis comprising a composition according to claim 3.

* * * * *